US006355406B2

(12) United States Patent
Majumdar et al.

(10) Patent No.: US 6,355,406 B2
(45) Date of Patent: Mar. 12, 2002

(54) PROCESS FOR FORMING ABRASION-RESISTANT ANTISTATIC LAYER WITH POLYURETHANE FOR IMAGING ELEMENT

(75) Inventors: Debasis Majumdar, Rochester, NY (US); Dennis J. Eichorst, Lenexa, KS (US); Kenneth L. Tingler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/735,018

(22) Filed: Dec. 12, 2000

Related U.S. Application Data

(63) Continuation-in-part of application No. 09/173,409, filed on Oct. 15, 1998, now Pat. No. 6,190,846.

(51) Int. Cl.[7] ............................ G03C 1/89; H01B 1/00; C08J 3/02; C08L 75/00; C08K 3/20

(52) U.S. Cl. ....................... 430/529; 430/527; 430/531; 430/41; 430/56; 430/201; 250/500; 524/501; 524/507

(58) Field of Search ................................ 430/527, 529, 430/531, 201, 41, 56; 252/500; 524/501, 507

(56) References Cited

U.S. PATENT DOCUMENTS

| | | | | |
|---|---|---|---|---|
| 2,271,234 A | | 1/1942 | Staud et al. | |
| 2,327,828 A | | 8/1943 | Simmons | |
| 4,275,103 A | | 6/1981 | Tsubusaki et al. | |
| 4,394,444 A | | 7/1983 | Kawaguchi et al. | |
| 4,416,963 A | | 11/1983 | Takimoto et al. | |
| 4,418,141 A | | 11/1983 | Kawaguchi et al. | |
| 4,431,764 A | | 2/1984 | Yoshizumi | |
| 4,442,168 A | | 4/1984 | White et al. | |
| 4,495,276 A | | 1/1985 | Takimoto et al. | |
| 4,571,361 A | | 2/1986 | Kawaguchi et al. | |
| 4,571,365 A | | 2/1986 | Ashlock et al. | |
| 4,731,408 A | | 3/1988 | Jasne | |
| 4,828,971 A | | 5/1989 | Przezdziecki | |
| 4,880,703 A | | 11/1989 | Sakamoto et al. | |
| 4,987,042 A | | 1/1991 | Jonas et al. | |
| 4,999,276 A | | 3/1991 | Kuwabara et al. | |
| 5,026,622 A | | 6/1991 | Yamada et al. | |
| 5,093,439 A | | 3/1992 | Epstein et al. | |
| 5,122,445 A | | 6/1992 | Ishigaki | |
| 5,204,219 A | | 4/1993 | Van Ooij et al. | |
| 5,236,818 A | | 8/1993 | Carlson | |
| 5,254,448 A | | 10/1993 | Yamada et al. | |
| 5,273,822 A | | 12/1993 | Hayashi et al. | |
| 5,294,525 A | | 3/1994 | Yamauchi et al. | |
| 5,300,575 A | | 4/1994 | Jonas et al. | |
| 5,310,640 A | | 5/1994 | Markin et al. | |
| 5,312,681 A | | 5/1994 | Muys et al. | |
| 5,340,676 A | | 8/1994 | Anderson et al. | |
| 5,350,448 A | | 9/1994 | Dietz et al. | |
| 5,354,613 A | | 10/1994 | Quintens et al. | |
| 5,366,855 A | | 11/1994 | Anderson et al. | |
| 5,368,995 A | | 11/1994 | Christian et al. | |
| 5,370,981 A | * | 12/1994 | Krafft et al. | 430/529 |
| 5,372,924 A | | 12/1994 | Quintens et al. | |
| 5,382,494 A | | 1/1995 | Kudo et al. | |
| 5,391,472 A | | 2/1995 | Muys et al. | |
| 5,403,467 A | | 4/1995 | Jonas et al. | |
| 5,443,944 A | * | 8/1995 | Krafft et al. | 430/529 |
| 5,453,350 A | | 9/1995 | Kurachi et al. | |
| 5,459,021 A | | 10/1995 | Ito et al. | |
| 5,466,567 A | | 11/1995 | Anderson et al. | |
| 5,484,694 A | | 1/1996 | Lelental et al. | |
| 5,514,528 A | | 5/1996 | Chen et al. | |
| 5,529,884 A | | 6/1996 | Tutt et al. | |
| 5,529,891 A | | 6/1996 | Wang et al. | |
| 5,547,821 A | | 8/1996 | Melpolder et al. | |
| 5,565,311 A | | 10/1996 | Kawamoto | |
| 5,575,898 A | | 11/1996 | Wolf et al. | |
| 5,585,037 A | | 12/1996 | Linton | |
| 5,628,932 A | | 5/1997 | Linton | |
| 5,665,498 A | * | 9/1997 | Savage et al. | 430/529 |
| 5,674,654 A | * | 10/1997 | Zumhulyadis et al. | 430/62 |
| 5,679,505 A | * | 10/1997 | Tingler et al. | 430/530 |
| 5,700,623 A | | 12/1997 | Anderson et al. | |
| 5,707,791 A | * | 1/1998 | Ito et al. | 430/527 |
| 5,716,550 A | * | 2/1998 | Gardner et al. | 430/529 |
| 5,718,995 A | * | 2/1998 | Eichorst et al. | 430/531 |
| 5,786,134 A | | 7/1998 | Nair et al. | |
| 6,190,846 B1 | * | 2/2001 | Majumdar et al. | 430/529 |

FOREIGN PATENT DOCUMENTS

| | | |
|---|---|---|
| EP | 250154 | 12/1987 |
| EP | 301827 | 2/1989 |
| EP | 749040 | 12/1996 |
| EP | 752619 A2 | 1/1997 |
| JP | 4055492 | 2/1992 |

* cited by examiner

*Primary Examiner*—Richard L. Schilling
(74) *Attorney, Agent, or Firm*—Doreen M. Wells

(57) ABSTRACT

A process for forming an abrasion-resistant antistatic layer for an imaging element comprises: adjusting the pH of an aqueous composition of an electronically-conductive polymer to a pH of about 3 to about 10, and combining the pH-adjusted aqueous composition of the electronically-conductive polymer with an aqueous composition at a pH greater than 7 of a polyurethane film-forming binder having a tensile elongation to break of at least 50% and a Young's modulus measured at 2% elongation of at least 50000 psi. The process further comprises applying the resulting coating composition to the imaging element, thereby forming an abrasion-resistant antistatic layer on the element. The antistatic layer coating composition of the present invention can be applied to a wide variety of imaging elements, including, for example, photographic, electrostatographic, photothermographic, migration, electrothermographic, dielectric recording and thermal-dye-transfer imaging elements.

29 Claims, No Drawings

PROCESS FOR FORMING ABRASION-RESISTANT ANTISTATIC LAYER WITH POLYURETHANE FOR IMAGING ELEMENT

CROSS REFERENCE TO RELATED APPLICATION

This application is a Continuation-in-Part of application Ser. No. 09/173,409, filed Oct. 15, 1998, now U.S. Pat. No. 6,190,846, for ABRASION RESISTANT ANTISTATIC LAYER WITH ELECTRICALLY CONDUCTING POLYMER FOR IMAGING ELEMENT.

FIELD OF THE INVENTION

This invention relates in general to imaging elements, such as photographic, electrostatographic, and thermal imaging elements comprising a support, an image forming layer and an abrasion resistant electrically-conductive layer. More specifically, this invention relates to a process for providing abrasion-resistant electrically-conductive layers containing an electronically-conducting polymer and a polymeric binder.

BACKGROUND OF THE INVENTION

The problem of controlling static charge is well known in the field of photography. The accumulation of charge on film or paper surfaces leads to the attraction of dirt, which can produce physical defects. The discharge of accumulated charge during or after the application of the sensitized emulsion layer(s) can produce irregular fog patterns or "static marks" in the emulsion. The static problems have been aggravated by increases in the sensitivity of new emulsions, increases in coating machine speeds, and increases in post-coating drying efficiency. The charge generated during the coating process may accumulate during winding and unwinding operations, during transport through the coating machines and during finishing operations such as slitting and spooling. Static charge can also be generated during the use of the finished photographic film product. In an automatic camera, the winding of roll film in an out of the film cartridge, especially in a low relative humidity environment, can result in static charging. Similarly, high speed automated film processing can result in static charge generation. Sheet films (e.g., x-ray films) are especially susceptible to static charging during removal from light-tight packaging.

It is generally known that electrostatic charge can be dissipated effectively by incorporating one or more electrically-conductive "antistatic" layers into the film structure. Antistatic layers can be applied to one or to both sides of the film base as subbing layers either beneath or on the side opposite to the light-sensitive silver halide emulsion layers. An antistatic layer can alternatively be applied as an outer coated layer either over the emulsion layers or on the side of the film base opposite to the emulsion layers or both. For some applications, the antistatic agent can be incorporated into the emulsion layers. Alternatively, the antistatic agent can be directly incorporated into the film base itself.

A wide variety of electrically-conductive materials can be incorporated into antistatic layers to produce a wide range of conductivity. These can be divided into two broad groups: (i) ionic conductors and (ii) electronic conductors. In ionic conductors charge is transferred by the bulk diffusion of charged species through an electrolyte. Here the resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and are leached out of the antistatic layers during photographic processing, resulting in a loss of antistatic function. The conductivity of antistatic layers employing an electronic conductor depends on electronic mobility rather than ionic mobility and is independent of humidity. Antistatic layers containing semiconductive metal halide salts, semiconductive metal oxide particles, etc., have been described previously. However, these antistatic layers typically contain a high volume percentage of electronically conducting materials which are often expensive and impart unfavorable physical characteristics, such as color or reduced transparency, increased brittleness and poor adhesion, to the antistatic layer.

Colloidal metal oxide sols which exhibit ionic conductivity when included in antistatic layers are often used in imaging elements. Typically, alkali metal salts or anionic surfactants are used to stabilize these sols. A thin antistatic layer consisting of a gelled network of colloidal metal oxide particles (e.g., silica, antimony pentoxide, alumina, titania, stannic oxide, zirconia) with an optional polymeric binder to improve adhesion to both the support and overlying emulsion layers has been disclosed in EP 250,154. An optional ambifunctional silane or titanate coupling agent can be added to the gelled network to improve adhesion to overlying emulsion layers, as taught in EP 301,827 and U.S. Pat. No. 5,204,219, along with an optional alkali metal orthosilicate to minimize loss of conductivity by the gelled network when it is overcoated with gelatin-containing layers, as disclosed in U.S. Pat. No. 5,236,818. Also, it has been pointed out, in U.S. Pat. Nos. 4,442,168 and 4,571,365, that coatings containing colloidal metal oxides (e.g., antimony pentoxide, alumina, tin oxide, indium oxide) and colloidal silica with an organopolysiloxane binder afford enhanced abrasion resistance as well as provide antistatic function Antistatic layers containing electronic conductors such as conjugated conducting polymers, conducting carbon particles, crystalline semiconductor particles, amorphous semiconductive fibrils, and continuous semiconducting thin films can be used more effectively than ionic conductors to dissipate static charge since their electrical conductivity is independent of relative humidity and only slightly influenced by ambient temperature. Of the various types of electronic conductors, electrically conducting metal-containing particles, such as semiconducting metal oxides, are particularly effective when dispersed in suitable polymeric film-forming binders in combination with polymeric non-film-forming particles, as described in U.S. Pat. Nos. 5,340,676; 5,466,567; and 5,700,623. Binary metal oxides doped with appropriate donor heteroatoms or containing oxygen deficiencies have been disclosed in prior art to be useful in antistatic layers for photographic elements, for example, U.S. Pat. Nos. 4,275,103; 4,416,963; 4,495,276; 4,394,441; 4,418,141; 4,431,764; 4,495,276; 4,571,361; 4,999,276; 5,122,445; 5,294,525; 5,382,494; 5,459,021; 5,484,694 and others. Suitable claimed conductive metal oxides include: zinc oxide, titania, tin oxide, alumina, indium oxide, silica, magnesia, zirconia, barium oxide, molybdenum trioxide, tungsten trioxide, and vanadium pentoxide. Preferred doped conductive metal oxide granular particles include antimony-doped tin oxide, fluorine-doped tin oxide, aluminum-doped zinc oxide, and niobium-doped titania. Additional preferred conductive ternary metal oxides disclosed in U.S. Pat. No. 5,368,995 include zinc antimonate and indium antimonate. Other conductive metal-containing granular particles including metal borides, carbides, nitrides and silicides have been disclosed in Japanese Kokai No. JP 04-055,492.

One serious deficiency of such granular electronic conductor materials is that, especially in the case of semiconductive metal-containing particles, the particles usually are highly colored which render them unsuitable for use in coated layers on many photographic supports, particularly at high dry weight coverage. This deficiency can be overcome by using composite conductive particles consisting of a thin layer of conductive metal-containing particles deposited onto the surface of non-conducting transparent core particles whereby obtaining a lightly colored material with sufficient conductivity. For example, composite conductive particles consisting of two dimensional networks of fine antimony-doped tin oxide crystallites in association with amorphous silica deposited on the surface of much larger, non-conducting metal oxide particles (e.g., silica, titania, etc.) and a method for their preparation are disclosed in U.S. Pat. Nos. 5,350,448; 5,585,037 and 5,628,932. Alternatively, metal-containing conductive materials, including composite conducting particles, with high aspect ratio can be used to obtain conducting coatings with lighter color due to reduced dry weight coverage, as taught in, for example, U.S. Pat. Nos. 4,880,703 and 5,273,822). However, there is difficulty in the preparation of conductive coatings containing composite conductive particles, especially the ones with high aspect ratio, since the dispersion of these particles in an aqueous vehicle using conventional wet milling dispersion techniques and traditional steel or ceramic milling media often result in wear of the thin conducting layer from the core particle and/or reduction of the aspect ratio. Fragile composite conductive particles often cannot be dispersed effectively because of limitations on milling intensity and duration dictated by the need to minimize degradation of the morphology and electrical properties as well as the introduction of attrition-related contamination from the dispersion process.

Moreover, these metal containing semiconductive particles, can be quite abrasive and cause premature damage to finishing tools, such as, knives, slitters, perforators, etc. and create undesirable dirt and debris which can adhere to the imaging element causing defects.

The requirements for antistatic layers in silver halide photographic films are especially demanding because of the stringent optical requirements. Other types of imaging elements such as photographic papers and thermal imaging elements also frequently require the use of an antistatic layer. However, the requirements there are somewhat different. For example, for photographic paper, an additional criterion is the ability of the antistatic backing layer to receive printing (e.g., bar codes or other indicia containing useful information) typically administered by dot matrix or inkjet printers and to retain these prints or markings as the paper undergoes processing, viz., backmark retention.

Electrically-conductive layers are also commonly used in imaging elements for purposes other than providing static protection. Thus, for example, in electrostatographic imaging it is well known to utilize imaging elements comprising a support, an electrically-conductive layer that serves as an electrode, and a photoconductive layer that serves as the image-forming layer. Electrically-conductive agents utilized as antistatic agents in photographic silver halide imaging elements are often also useful in the electrode layer of electrostatographic imaging elements.

A particular embodiment of the present invention is intended for application in motion picture print films. Motion picture photographic films that are used as print films for movie theater projection have long used a carbon-black containing layer on the backside of the film, as described, for example, in U.S. Pat. Nos. 2,271,234 and 2,327,828. This backside layer provides both antihalation protection and antistatic properties. The carbon black is applied in an alkali-soluble binder that allows the layer to be removed by a process that involves soaking the film in alkali solution, scrubbing the backside layer and rinsing with water. This removal process, which takes place prior to image development, is both tedious and environmentally undesirable since large quantities of water are utilized in this film processing step. In addition, in order to facilitate removal during film processing, the carbon black-containing layer is not highly adherent to the photographic film support and may dislodge during various film manufacturing operations such as film slitting and film perforating. Carbon black debris generated during these operations may become lodged on the photographic emulsion and cause image defects during subsequent exposure and film processing.

After removal of the carbon black-containing layer the film's antistatic properties are lost. Undesired static charge build-up can then occur on processed motion picture print film when transported through projectors or on rewind equipment. These high static charges can attract dirt particles to the film surface. Once on the film surface, these particles can create abrasion or scratches or, if sufficiently large, the dirt particles may be seen on the projected film image.

These conventional carbon black-containing backing layers also typically contain a lubricant or are overcoated with a lubricant in order to improve conveyance during manufacturing operations or image exposures (i.e., printing). After processing, the lubricant is removed along with the carbon black, and, therefore, processed print films has a high coefficient of friction on the backside of the film which is undesirable for good transport and film durability during repeated cycles through a movie theater projector.

A photographic element having a conductive layer containing semiconductive tin oxide or indium oxide particles on the opposite side of the support from the silver halide sensitized emulsion layers with a polymer-containing intermediate backing layer overlying the conductive layer and an additional protective layer overlying the backing layer is disclosed in U.S. Pat. No. 5,026,622. The outermost protective layer includes gelatin, a matting agent, a fluorine-containing anionic surfactant, and dioctyl sulfosuccinate. Another conductive three-layer backing having an antistatic layer containing granular semiconductive metal oxide particles; an intermediate backing layer containing a latex of a water-insoluble polymer, matting agent, polystyrene-sulfonate sodium salt, and gelatin; and an outermost protective layer containing at least one hydrophobic polymer such as a polyester or polyurethane, fluorine-containing surfactant(s), matting agent(s), and an optional slipping aid is described in U.S. Pat. No. 5,219,718. Further, a three-layer backing having an antistatic layer including conductive metal oxide granular particles or a conductive polymer and a hydrophobic polymer latex, gelatin, and an optional hardener is overcoated with an intermediate backing layer containing gelatin, a hydrophobic polymer latex, a matting agent, and backing dyes that is simultaneously overcoated with a protective layer comprising a fluorine-containing surfactant, a matting agent, gelatin, and optionally, a polymer latex is taught in U.S. Pat. No. 5,254,448. Photographic elements including such multi-layer backings were disclosed to retain antistatic properties after processing, exhibit acceptable transport performance against Teflon coated surfaces, and have good "anti-flaw" properties.

The use of small (<15 nm) antimony-doped tin oxide particles having a high (>8 atom %) antimony dopant level and a small crystallite size (<100 Å) in abrasion resistant conductive backing layers is claimed in U.S. Pat. No. 5,484,694. A multi-element curl control layer on the backside of the support wherein the conductive layer typically is located closest to the support, with an overlying intermediate layer containing binder and antihalation dyes, and an outermost protective layer containing binder, matte, and surfactant is also claimed.

Simplified two-layer conductive backings are taught in U.S. Pat. Nos. 5,366,855; 5,382,494; 5,453,350; and 5,514,528. An antistatic layer containing colloidal silver-doped vanadium pentoxide and a vinylidene chloride-containing latex binder or a polyesterionomer dispersion coated on the opposite side of the support from the silver halide emulsion layer and subsequently overcoated with a protective layer including a coalesced layer containing both film-forming and non-film-forming colloidal polymeric particles, optional cross-linking agents, matting agents, and lubricating agents is disclosed in U.S. Pat. No. 5,366,855. Such a protective layer was also disclosed to function as an impermeable barrier to processing solutions, to resist blocking, to provide good scratch and abrasion resistance, and to exhibit excellent lubricity. However, the addition of hard polymeric particles, such as poly(methyl methacrylate), to a film-forming polymer can produce brittleness in a coated layer. A photographic element containing an aqueous-coated antistatic layer containing conductive fine particles such as metal oxide particles, a butyl acrylate-containing terpolymer latex, and optionally, a hardening agent and a surfactant that is overcoated with a solvent-coated, transparent magnetic recording layer containing preferably nitrocellulose or diacetyl cellulose as the binder and carnauba wax as a lubricant is taught in U.S. Pat. Nos. 5,382,494 and 5,453,350. Similarly, an antistatic layer containing conductive metal oxide granular particles in a hydrophilic binder applied as an aqueous or solvent dispersion and overcoated with a cellulose ester layer optionally containing ferromagnetic particles is described in U.S. Pat. No. 5,514,528. A separate lubricating overcoat layer can be optionally applied on top of the cellulose ester layer.

The inclusion of lubricant particles of a specified size, especially those having a fluorine-containing polymer, in a protective surface or backing layer containing a dispersing aid or stabilizer, a hydrophilic or resin-type binder and optionally, crosslinking agents, matting agents, antistatic agents, colloidal inorganic particles, and various other additives is described in U.S. Pat. No. 5,529,891. Photographic elements incorporating such protective layers were disclosed to exhibit improved surface scratch and abrasion resistance as evaluated on a Taber Abrader.

Another method to improve the slipperiness and scratch resistance of the back surface of a photographic element is described in U.S. Pat. No. 5,565,311. The incorporation of slipping agents containing compounds having both a long-chain aliphatic hydrocarbon moiety and a polyether moiety as a solution, emulsion or dispersion preferably in a backing protective layer containing a film-forming binder and an optional crosslinking agent overlying an antistatic layer is reported to provide improved slipperiness and scratch resistance and reduce the number of coated layers in the backing. The addition of a matting agent can improve scratch resistance as well as minimize blocking of the emulsion surface layer or emulsion-side primer layer by the backing layer. Further, the inclusion of an antistatic agent, such as conductive metal oxide particles, in a backing protective layer containing slipping and matting agents and optionally, nonionic, anionic, cationic, or betaine-type fluorine-containing surfactants is disclosed in U.S. Pat. No. 5,565,311.

An electrically-conductive single layer backing having a combination of electrically-conductive fine particles, such as conductive metal oxide granular particles, and particular gelatin-coated water-insoluble polymer particles is disclosed in European Patent Application No. 749,040 to provide both a high degree of conductivity at low volumetric concentrations of conductive particles and a high degree of abrasion resistance. The use of a combination of insoluble polymer particles and a hydrophilic colloid with conductive metal oxide fine particles to prepare electrically-conductive layers that require lower volume fractions of conductive particles than conductive layers prepared using only a hydrophilic colloid as binder is disclosed in U.S. Pat. No. 5,340,676. A similar beneficial result is disclosed in U.S. Pat. No. 5,466,567 for electrically-conductive layers in which a combination of a hydrophilic colloid and pre-crosslinked gelatin particles is used as the binder for the electroconductive fine granular particles. However, the abrasion resistance of such gelatin-containing layers is unsuitable, particularly for motion picture applications.

Electrically-conductive backing layers for use in thermally processable imaging elements are described in U.S. Pat. Nos. 5,310,640 and 5,547,821. As described in U.S. Pat. No. 4,828,971, backing layers useful for thermally processable imaging elements must provide adequate conveyance properties, resistance to deformation during thermal processing, satisfactory adhesion to the support, freedom from cracking and marking, reduced electrostatic charging effects, and exhibit no sensitometric effects. The use of electrically-conductive backings and protective overcoat layers for thermally processable imaging elements is described in U.S. Pat. No. 5,310,640. In one preferred embodiment, a protective layer containing polymethylmethacrylate as binder and a polymeric matting agent is positioned overlying a conductive layer containing silver-doped vanadium pentoxide dispersed in a polymeric binder. The use of a single-layer conductive backing having antimony-doped tin oxide granular particles, a matting agent, and a polymeric film-forming binder is taught in U.S. Pat. No. 5,547,821. Another preferred embodiment teaches the use of antimony-doped tin oxide granular particles in a conductive overcoat layer overlying the imaging layer. The reported Taber abrasion test results suggest that the relative level of abrasion resistance for the single-layer backings is inferior to that for the overcoated conductive backing layer described in U.S. Pat. No. 5,310,640. Also, surface scattering and haze is higher for single-layer conductive backings than for overcoated conductive backings. Further, from the surface resistivity and dusting data reported in U.S. Pat. No. 5,547,821, it can be concluded that it is particularly difficult to simultaneously obtain low dusting and high conductivity with single-layer conductive backings containing a polyurethane binder and granular electroconductive particles.

An electrically-conductive single-layer backing for the reverse side of a laser dye-ablative imaging element comprising electrically-conductive metal-containing particles, such as antimony-doped tin oxide particles, a polymeric binder, such as gelatin or a vinylidene chloride-based terpolymer latex, a matting agent, a coating aid, and an optional hardener is described in U.S. Pat. No. 5,529,884. Surface resistivity values of ~9 log ohms/square ($10^9$ohms/square) for the conductive backings were measured before and after the ablation process and exhibited virtually no change. No test data for abrasion or scratch resistance of the backing layers was reported.

An abrasion-resistant protective overcoat including a polyurethane binder with specific physical properties, a lubricant, a matting agent, and a crosslinking agent overlying a conductive backing layer is described in U.S. Pat. No. 5,679,505 for motion picture print films; the abrasion-resistant protective overcoat contains a crosslinked polyurethane binder and, thus, provides a nonperneable chemical barrier for antistatic layers containing, preferably, colloidal vanadium pentoxide antistatic agent which is known to degrade in contact with photographic processing solutions. Although U.S. Pat. No. 5,679,505 can provide certain advantages over conventional carbon black containing backing layers, the use of a crosslinking agent in the topcoat (without which the conductivity of the preferred antistatic layer will be jeopardized) poses some manufacturing concerns: crosslinked polyurethanes of U.S. Pat. No. 5,679,505 may impose additional constraints on the composition and pot-life of the coating solutions as well as other manufacturing parameters; from a health and safety standpoint, some crosslinking agents may require special handling and disposal procedures; removal of a crosslinked polyurethane layer can hinder recycling of the support. Moreover, U.S. Pat. No. 5,679,505 teaches a two-layer system comprising an antistatic layer and a protective topcoat, the practice of which is inherently more complex than a single layer system: any incompatibility between the two layers can cause imperfections, such as repellencies, particulate formation, or other interaction products at the interface and adhesion failure, leading to unacceptable product quality and lower yield.

As indicated above, the prior art on electrically-conductive layers in imaging elements is extensive and a very wide variety of different materials have been proposed for use as the electrically-conductive agent. There is still, however, a critical need in the art for improved electrically-conductive layers which are useful in a wide variety of imaging elements, which can be manufactured at reasonable cost, which are environmentally benign, which are durable and abrasion-resistant, which are effective at low coverage, which are adaptable to use with transparent imaging elements, which do not exhibit adverse sensitometric or photographic effects, and which maintain electrical conductivity even after coming in contact with processing solutions (since it has been observed in industry that loss of electrical conductivity after processing may increase dirt attraction to processed films which, when printed, may cause undesirable defects on the prints).

In addition to controlling static charging, auxiliary layers applied to photographic elements also provide many other functions. These include providing resistance to abrasion, curl, solvent attack, halation and providing reduced friction for transport. One additional feature that an auxiliary layer must provide when the layer serves as the outermost layer is resistance to the deposition of material onto the element upon photographic processing. Such material can impact the physical performance of the element in a variety of ways. For example, large deposits of material on a photographic film lead to readily visible defects on photographic prints or are visible upon display of motion picture film. Alternatively, post-processing debris can influence the ability of a processed film to be overcoated with an ultraviolet curable abrasion resistant layer, as is done in professional photographic processing laboratories employing materials such as PhotoGard™, available from 3M.

It is toward the objective of providing improved electrically-conductive layers that more effectively meet the diverse needs of imaging elements—especially of silver halide photographic films but also of a wide range of other imaging elements—than those of the prior art that the present invention is directed. An additional objective of the present invention as an outermost backing layer is to provide scratch and abrasion resistance to the imaging elements through the proper choice of a binder with optimum mechanical properties.

Electrically conducting polymers have recently received attention from various industries because of their electronic conductivity. Although many of these polymers are highly colored and are less suited for photographic applications, some of these electrically conducting polymers, in particular, electronically-conducting polymers such as substituted or unsubstituted pyrrole-containing polymers, described in U.S. Pat. Nos. 5,665,498 and 5,674,654, substituted or unsubstituted thiophene-containing polymers, described in U.S. Pat. Nos. 5,300,575; 5,312,681; 5,354,613; 5,370,981; 5,372,924; 5,391,472; 5,403,467; 5,443,944; 5,575,898; 4,987,042 and 4,731,408, and substituted or unsubstituted aniline-containing polymers, described in U.S. Pat. Nos. 5,716,550 and 5,093,439 are transparent and not prohibitively colored, at least when coated in thin layers at moderate coverage. Because of their electronic rather than ionic conductivity, these polymers are conducting even at low humidity and, moreover, can retain sufficient conductivity even after wet chemical processing to provide what is known in the art as "process-surviving" antistatic characteristics to the photographic support to which they are applied. Unlike metal-containing semiconducting particulate antistatic materials, e.g., antimony-doped tin oxide, the aforementioned electrically conducting polymers are less abrasive, environmentally more acceptable because of the absence of heavy metals, and, in general, less expensive.

It has been reported, however, in U.S. Pat. No. 5,354,613 that a thiophene-containing polymer layer has low mechanical strength and canin the absence of an overcoat, be easily damaged. Protective layers such as poly(methyl methacrylate) can be applied on such thiophene-containing antistatic layers but, because they are typically are coated out of organic solvents, are not especially desirable. Moreover, these protective layers may be too brittle to be an external layer for certain applications, such as motion picture print films, as illustrated in U.S. Pat. No. 5,679,505. Use of aqueous polymer dispersions of, for example, vinylidene chloride, styrene, acrylonitrile, alkyl acrylates and alkyl methacrylates) has been taught in U.S. Pat. No. 5,312,681 as an overlying barrier layer for thiophene-containing antistat layers. A hydrophilic colloid-containing layer is adhered to the overlying barrier layer, but, again, the physical properties of these barrier layers may preclude their use as an outermost layer in certain applications. The use of a thiophene-containing outermost antistat layer has also been taught in U.S. Pat. No. 5,354,613, wherein a hydrophobic polymer with high glass transition temperature is incorporated in the antistat layer. These hydrophobic polymers, however, reportedly may require organic solvent(s) and/or swelling agent(s) "in an amount of at least 50% by weight" of the polythiophene to ensure coherence and film forming capability.

Additionally, these electronically-conducting polymers are usually complexed with an acid such as polystyrenesulfonic acid which acts as a p-type dopant to greatly enhance the conductivity of the polymer, as discussed in, for example, "Poly(3,4-ethylenedioxythiophene) and its derivatives: past, present, and future", B. Greonendaal, et. al., *Advanced Materials*, Vol. 12, No. 7,2000. The presence of the acid dopant causes aqueous dispersions of the electronically-conducting polymers to be acidic, with pH value as low as 1–2. A vast majority of polymeric binders, particularly polyurethane latices, on the other hand, are marketed as basic dispersions, with pH values ~8, and are unstable at low pH. For example, many of the polyurethanes disclosed in Table 1 of U.S. Pat. No. 5,679,505 as suitable for use as protective overcoats for motion picture films, are of pH ~8, as illustrated in the Table 1 below:

| Polymer designation in U.S. Pat. No. 5,679,505 | Polyurethane description | Supplier | pH |
|---|---|---|---|
| P-3 | Witcobond 232 | Witco Corporation | 8 |
| P-5 | Witcobond 242 | Witco Corporation | 8 |
| P-6 | Witcobond 240 | Witco Corporation | 8 |
| P-7 | Sancure 898 | B. F. Goodrich Co. | 8 |
| P-8 | Sancure 815 | B. F. Goodrich Co. | 8 |

Such a mismatch of pH between the electronically-conducting polymers and a majority of useful polyurethane dispersions poses a major challenge in combining the two into a stable, particulate-free aqueous formulation that can be coated into a homogeneous, transparent single layer on photographic supports.

As will be demonstrated hereinbelow, the present invention provides a method to form single outermost layers for an imaging element, providing humidity independent, process-surviving antistatic characteristics as well as resistance to abrasion and scratching, without necessitating any crosslinking agent or a protective overcoat. Such an external layer, as per the present invention, can be coated from an aqueous composition comprising a properly pH adjusted electronically-conducting polymer, and a polyurethane binder dispersion of pH>7, wherein the polyurethane is of a tensile elongation to break of at least 50% and a Young's modulus measured at 2% elongation of at least 50000 psi.

SUMMARY OF THE INVENTION

The present invention is directed to a process for forming an abrasion-resistant antistatic layer for an imaging element, wherein the process comprises: adjusting the pH of an aqueous composition of an electronically-conductive polymer to a pH of about 3 to about 10, and combining the pH-adjusted aqueous composition of the electronically-conductive polymer with an aqueous composition at a pH greater than 7 of a polyurethane film-forming binder having a tensile elongation to break of at least 50% and a Young's modulus measured at 2% elongation of at least 50000 psi. The process further comprises applying the resulting coating composition to the imaging element, thereby forming an abrasion-resistant antistatic layer on the element.

DETAILED DESCRIPTION OF THE INVENTION

The antistatic layer coating composition of the present invention can be applied to a wide variety of imaging elements, including, for example, photographic, electrostatographic, photothermographic, migration, electrothermographic, dielectric recording and thermal-dye-transfer imaging elements.

Photographic elements provided with an antistatic layer in accordance with the present invention can differ widely in structure and composition, including, for example, the type of support, the number and composition of the image-forming layers, and the auxiliary layers that may be included. In particular, the photographic elements can be still films, motion picture films, x-ray films, graphic arts films, paper prints or microfiche, especially CRT-exposed autoreversal and computer output microfiche films. They can be black-and-white elements, color elements adapted for use in a negative-positive process, or color elements adapted for use in a reversal process.

Photographic elements can comprise any of a wide variety of supports. Typical supports include cellulose nitrate film, cellulose acetate film, poly(vinyl acetal) film, polystyrene film, poly(ethylene terephthalate) film, poly(ethylene naphthalate) film, polycarbonate film, polyethylene films, polypropylene films, glass, metal, paper (both natural and synthetic), polymer-coated paper, and the like. The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example, gelatin, gelatin derivatives, cellulose derivatives, polysaccharides such as dextran, gum arabic, and the like, and synthetic polymeric substances such as water-soluble polyvinyl compounds like poly (vinylpyrrolidone), acrylamide polymers, and the like. A particularly common example of an image-forming layer is a gelatin-silver halide emulsion layer.

In order to promote adhesion between the conductive backing of this invention and the support, the support can be surface-treated by various processes including corona discharge, glow discharge, UV exposure, flame treatment, electron-beam treatment, as described in U.S. Pat. No. 5,718,995, or treatment with adhesion-promoting agents, including dichloro- and trichloro-acetic acid, phenol derivatives such as resorcinol and p-chloro-m-cresol, solvent washing or overcoated with adhesion promoting primer or tie layers containing polymers such as vinylidene chloride-containing copolymers, butadiene-based copolymers, glycidyl acrylate or methacrylate-containing copolymers, maleic anhydride-containing copolymers, condensation polymers such as polyesters, polyamides, polyurethanes, polycarbonates, mixtures and blends thereof, and the like.

Further details with respect to the composition and function of a wide variety of different imaging elements are provided in U.S. Pat. No. 5,300,676 and references described therein, the disclosures of which are incorporated herein by reference. All of the imaging processes described in the '676 patent, as well as many others, have in common the use of an electrically-conductive layer as an electrode or as an antistatic layer. The requirements for a useful electrically-conductive layer in an imaging environment are extremely demanding and thus the art has long sought to develop improved electrically-conductive layers exhibiting the necessary combination of physical, optical and chemical properties.

The antistatic coating compositions of the invention can be applied to the aforementioned film or paper supports by any of a variety of well-known coating methods. Handcoating techniques include using a coating rod or knife or a doctor blade. Machine coating methods include skim pan/air knife coating, roller coating, gravure coating, curtain coating, bead coating or slide coating. Alternatively, the antistatic layer or layers of the present invention can be applied to a single or multilayered polymeric web by any of the aforementioned methods, and the said polymeric web can subsequently be laminated (either directly or after stretching) to a film or paper support of an imaging element (such as those discussed above) by extrusion, calendering or any other suitable method.

The antistatic layer or layers of the present invention can be applied to the support in various configurations depending upon the requirements of the specific application. As an abrasion resistant layer, the antistatic layer of the present invention is preferred to be an outermost layer, preferably on the side of the support opposite to the imaging layer. However, the layer of the present invention can be placed at any other location within the imaging element, to fulfill other objectives. In the case of photographic elements, an antistatic layer can be applied to a polyester film base during the support manufacturing process after orientation of the cast resin on top of a polymeric undercoat layer. The antistatic layer can be applied as a subbing layer under the sensitized emulsion, on the side of the support opposite the emulsion or on both sides of the support. Alternatively, it can be applied over the imaging layers on either or both sides of the support, particularly for thermally-processed imaging elements. When the antistatic layer is applied as a subbing layer under the sensitized emulsion, it is not necessary to apply any intermediate layers such as barrier layers or adhesion promoting layers between it and the sensitized emulsion, although they can optionally be present. Alternatively, the antistatic layer can be applied as part of a multi-component curl control layer on the side of the support opposite to the sensitized emulsion. The present invention can be used in conjunction with an intermediate layer, containing primarily binder and antihalation dyes, that functions as an antihalation layer. Alternatively, these could be combined into a single layer. Detailed description of antihalation layers can be found in U.S. Pat. No. 5,679,505 and references therein, the disclosures of which are incorporated herein by reference.

Typically, the antistatic layer may be used in a single or multilayer backing layer which is applied to the side of the support opposite to the sensitized emulsion. Such backing layers, which typically provide friction control and scratch, abrasion, and blocking resistance to imaging elements are commonly used, for example, in films for consumer imaging, motion picture imaging, business imaging, and others. In the case of backing layer applications, the antistatic layer can optionally be overcoated with an additional polymeric topcoat, such as a lubricant layer, and/or an alkali-removable carbon black-containing layer, as described in U.S. Pat. Nos. 2,271,234 and 2,327,828, for antihalation and camera-transport properties, and/or a transparent magnetic recording layer for information exchange, for example, and/or any other layer(s) for other functions.

In the case of photographic elements for direct or indirect x-ray applications, the antistatic layer can be applied as a subbing layer on either side or both sides of the film support. In one type of photographic element, the antistatic subbing layer is applied to only one side of the film support and the sensitized emulsion coated on both sides of the film support. Another type of photographic element contains a sensitized emulsion on only one side of the support and a pelloid containing gelatin on the opposite side of the support. An antistatic layer can be applied under the sensitized emulsion or, preferably, the pelloid. Additional optional layers can be present. In another photographic element for x-ray applications, an antistatic subbing layer can be applied either under or over a gelatin subbing layer containing an antihalation dye or pigment. Alternatively, both antihalation and antistatic functions can be combined in a single layer containing conductive particles, antihalation dye, and a binder. This hybrid layer can be coated on one side of a film support under the sensitized emulsion.

It is also contemplated that the electrically-conductive layer described herein can be used in imaging elements in which a relatively transparent layer containing magnetic particles dispersed in a binder is included. The electrically-conductive layer of this invention functions well in such a combination and gives excellent photographic results. Transparent magnetic layers are well known and are described, for example, in U.S. Pat. No. 4,990,276, European Pat. 459,349, and Research Disclosure, Item 34390, November, 1992, the disclosures of which are incorporated herein by reference. As disclosed in these publications, the magnetic particles can be of any type available such as ferro- and ferri-magnetic oxides, complex oxides with other metals, ferrites, etc. and can assume known particulate shapes and sizes, may contain dopants, and may exhibit the pH values known in the art. The particles may be shell coated and may be applied over the range of typical laydown.

Imaging elements incorporating conductive layers of this invention that are useful for other specific applications such as color negative films, color reversal films, black-and-white films, color and black-and-white papers, electrophotographic media, thermal dye transfer recording media etc., can also be prepared by the procedures described hereinabove. Other addenda, such as polymer latices to improve dimensional stability, hardeners or crosslinking agents, and various other conventional additives can be present optionally in any or all of the layers of the various aforementioned imaging elements.

The antistatic layer of the present invention comprises an electronically-conducting polymer, as component A and a polyurethane binder with a tensile elongation to break of at least 50% and a Young's modulus measured at 2% elongation of at least 50000 psi as component B, and can be coated out of an aqueous system on a suitable imaging element. It is crucial to adjust the pH of component A to a value of between 3 and 10, and preferably between 5 and 9, before adding any other ingredient to the coating composition, in order to prevent flocculation or other undesirable interaction. Suitable agents for pH adjustment are ammonium hydroxides, alkali metal hydroxides, and alkylamines, for example, ammonium hydroxide, sodium hydroxide, potassium hydroxide, tetraethylammonium hydroxide, and triethylamine, the last-named reagent being especially preferred. Component B in the coating composition typically does not require any prior pH adjustment and can be added to the coating composition directly.

Component A can be chosen from any or a combination of electronically-conducting polymers, such as substituted or unsubstituted pyrrole-containing polymers, as mentioned in U.S. Pat. Nos. 5,665,498 and 5,674,654, substituted or unsubstituted thiophene-containing polymers, as mentioned in U.S. Pat. Nos. 5,300,575; 5,312,681; 5,354,613; 5,370,981; 5,372,924; 5,391,472; 5,403,467; 5,443,944; 5,575,898; 4,987,042 and 4,731,408, and substituted or unsubstituted aniline-containing polymers, as mentioned in U.S. Pat. Nos. 5,716,550 and 5,093,439. The electronically conducting polymer may be soluble or dispersible in organic solvents or water or mixtures thereof For environmental reasons, aqueous systems are preferred. Polyanions used in the synthesis of these electronically conducting polymers are the anions of polymeric carboxylic acids such as polyacrylic acids, polymethacrylic acids or polymaleic acids and polymeric sulfonic acids such as polystyrenesulfonic acids and polyvinylsulfonic acids, the polymeric sulfonic acids being those preferred for this invention. These polycarboxylic and polysulfonic acids may also be copolymers of vinylcarboxylic and vinylsulfonic acids with other polymerizable monomers such as the esters of acrylic acid and styrene. The molecular weight of the polyacids providing the polyanions preferably is 1,000 to 2,000,000, particularly preferably 2,000 to 500,000. The polyacids or their alkali salts are commonly available, e.g., polystyrenesulfonic acids and polyacrylic acids, or they may be produced based on known methods. Instead of the free acids required for the formation of the electrically conducting polymers and polyanions, mixtures of alkali salts of polyacids and appropriate amounts of monoacids may also be used. Preferred electrically conducting polymers for the present invention include polypyrrole styrene sulfonate (referred to as polypyrrole/poly (styrene sulfonic acid) in U.S. Pat. No. 5,674,654), 3,4-dialkoxy substituted polypyrrole styrene sulfonate, and 3,4-dialkoxy substituted polythiophene styrene sulfonate. The most preferred substituted electrically conductive polymers include poly(3,4-ethylene dioxypyrrole styrene sulfonate) and poly(3,4-ethylene dioxythiophene styrene sulfonate).

Component B is a polyurethane preferably an aliphatic polyurethane chosen for its excellent thermal and UV stability and freedom from yellowing. The polyurethanes, suitable for the present invention, are those having a tensile elongation to break of at least 50% and a Young's modulus measured at an elongation of 2% of at least 50000 psi. As taught in U.S. Pat. No. 5,679,505, these physical property requirements insure that the antistatic layer is hard yet tough enough to simultaneously provide excellent abrasion resistance and outstanding resiliency, in applications such as motion picture print films which need to survive hundreds of cycles through motion picture projectors. Examples and details of these specific polyurethanes are mentioned in U.S. Pat. No. 5,679,505 and references therein, the disclosures of which are incorporated herein by reference. These polyurethanes are typically available as dispersions having a pH ~8.

Use of polyurethanes in a polythiophene-containing antistatic layer has been disclosed in U.S. Pat. No. 5,300,575. However, the mechanical properties of such polyurethanes have not been addressed in that patent. As amply demonstrated in U.S. Pat. No. 5,679,505, not all polyurethanes possess the mechanical properties necessary to provide the level of wear, abrasion and scratch protection as required by applications such as motion picture print films. Use of polyurethane as a third component in antistatic primers containing polythiophene and sulfonated polyesters has been disclosed in U.S. Pat. No. 5,391,472. However, as before, no consideration of the mechanical properties of the polyurethane is disclosed in that patent. Moreover, as demonstrated in the U.S. Pat. No. 6,096,491, not all polyurethanes are compatible with electrically conducting polymers. Use of polyurethane with specific mechanical properties for application in motion picture print films have been taught in U.S. Pat. No. 5,679,505. However, as mentioned earlier, '505 teaches, in contrast to the present invention, a two-layer system, with the polyurethane topcoat comprising a crosslinking agent. The results obtained in accordance with the present invention, manifested as a single abrasion-resistant antistatic layer containing two components, component A being an electronically conducting polymer and component B being a polyurethane with a tensile elongation to break of at least 50% and a Young's modulus measured at an elongation of 2% of at least 50000 psi, with or without any crosslinking agent, are neither expected from nor anticipated by the disclosures of the cited prior art.

The polyurethane binder can be optionally crosslinked or hardened by adding a crosslinking agent that reacts with functional groups present in the polyurethane, such as carboxyl groups. Crosslinking agents such as polyaziridines, carbodiimides, epoxies, and the like are suitable for this purpose. The crosslinking agent can be used at about 0.5 to about 30 weight % based on the polyurethane. However, a crosslinking agent concentration of 2 to 12 weight % based on the polyurethane is preferred.

A suitable lubricating agent can be included in the layer of this invention to achieve a coefficient of friction that ensures good transport characteristics during manufacturing and customer handling. The desired values of the coefficient of friction and examples of suitable lubricating agents are disclosed in the previously mentioned U.S. Pat. No. 5,679,505.

The relative amount of the electronically-conducting polymer (component A) can vary from 0.1–99 weight % and the relative amount of the polyurethane binder (component B) can vary from 99.9–1 weight % in the dried layer. In a preferred embodiment of this invention as an outermost abrasion resistant layer, the amount of electrically-conducting polymer should be 2–70 weight %, and the polyurethane binder should be 98–30 weight % in the dried layer. As will be demonstrated hereinbelow through working examples, the use of a crosslinking agent in the layers of the present invention is optional.

In another embodiment of the present invention, a third polymeric component may be incorporated in the antistatic layer for improved dispersion quality (of the electrically conducting polymer), electrical conductivity and physical properties wherein this third component may comprise a sulfonated polystyrene and/or a copolymer of sulfonated styrene-maleic anhydride and/or a polyester ionomer or the like known in the art for their aforementioned properties. The relative amount of this third component may vary from 0–30 weight % but preferably between 5–20 weight % in the dried layer. The coating composition is coated at a dry weight coverage of between 5 $mg/m^2$ and 10,000 $mg/m^2$, but preferably between 10–2000 $mg/m^2$.

In addition to binders and solvents, other components that are well known in the photographic art may also be present in the electrically-conductive layer. These additional components include: surfactants and coating aids, thickeners, coalescing aids, crosslinking agents or hardeners, soluble and/or solid particle dyes, antifoggants, matte beads, lubricants, and others.

The present invention is further illustrated by the following examples of its practice. However, the scope of this invention is by no means restricted to these specific examples.

Sample Preparation

Electrically Conducting Polymer (component A)

The electronically conducting polymer (component A) in the following samples is either a polypyrrole or a polythiophene derivative. The conducting polypyrrole is derived from an aqueous dispersion of polypyrrole/poly (styrene sulfonic acid) prepared by oxidative polymerization of pyrrole in aqueous solution in the presence of poly (styrene sulfonic acid) using ammonium persulfate as the oxidant, following U.S. Pat. No. 5,674,654. This electrically conducting polymer is henceforth referred to as PPy.

The electronically conducting polythiophene is derived from an aqueous dispersion of a commercially available thiophene-containing polymer supplied by Bayer Corporation as Baytron P™ This electrically conducting polymer is based on an ethylenedioxythiophene henceforth referred to as EDOT.

For examples of the present invention, the electronically conducting polymer (component A) dispersion is adjusted to a pH of between 8 and 9 by triethylamine.

Polyurethane Binder (component B)

The polyurethane binder (component B) in the following samples of the present invention is derived either from an aqueous anionic dispersion Witcobond 232™, supplied by Witco Corporation, or from an aqueous anionic dispersion Sancure 898™, supplied by BFGoodrich Corporation. As indicated in U.S. Pat. No. 5,679,505, both polyurethanes fulfill the criteria of tensile elongation to break of at least 50% and a Young's modulus measured at an elongation of 2% of at least 50000 psi, as required by the present invention.

Coating Composition

The coating composition for the examples of the invention comprises (1) electronically-conducting polymer (component A) dispersion, with pH adjusted between 8 and 9, (2) water, (3) polyurethane binder (component B) dispersion in its "as received" form, and (4) a non-ionic surfactant Pluronic F88™, supplied by BASF Corporation, at a level of 0.08% of the coating composition, combined in that order. The solid content of the coating composition is maintained at 4%. For a few examples, an aziridine crosslinking agent Neocryl CX-100™, supplied by Zeneca Corporation, is additionally incorporated in the coating composition just prior to coating, at a level of 5% dry weight of the polyurethane.

Film Based Web

Poly(ethylene terephthalate) or PET film base that had been previously coated with a subbing layer of vinylidene chloride-acrylonitrile-acrylic acid terpolymer latex is used as the web on which aqueous coatings are applied by a suitable coating method. The coating compositions comprise components A and B in varying proportions. The coatings are dried between 80° C. and 125° C. The coating coverage varies between 300 mg/m$^2$ and 1000 mg/m$^2$ when dried.

Test Methods

For resistivity tests, samples are preconditioned at 50%RH 23° C. for at least 24 hours prior to testing. Surface electrical resistivity (SER) is measured with a Keithley Model 616 digital electrometer using a two point DC probe by a method similar to that described in U.S. Pat. No. 2,801,191. Internal resistivity or "water electrode resistivity" (WER) is measured by the procedures 10 described in R. A. Elder, "Resistivity Measurements on Buried Conductive Layers", EOS/ESD Symposium proceedings, September 1990, pages 251–254.

Dry adhesion is evaluated by scribing a small cross-hatched region into the coating with a razor blade. A piece of high-tack adhesive tape is placed over the scribed region and quickly removed. The relative amount of coating removed is a qualitative measure of the dry adhesion.

Taber abrasion tests are performed in accordance with the procedures set forth in ASTM D1044. The abraded haze values are compared with that of a similarly tested coating of Witcobond 232 (with ~5% by dry weight of aziridine cross linking agent) at a nominal dry coverage of 1 g/m$^2$ on subbed PET support. The latter coating is chosen for comparison, since it is a preferred topcoat with scratch and abrasion resistance for a motion picture print film, as per U.S. Pat. No. 5,679,505.

Working Examples

Samples 1–9 are prepared in accordance with the present invention, using EDOT as component A and Witcobond 232™ as component B. All these samples contain a small amount of surfactant Pluronic F88™ supplied by BASF Corporation. Samples 1–9 also comprise an aziridine crosslinking agent Neocryl CX-100™, supplied by Zeneca Corporation, at a level of 5% dry weight of the polyurethane. Details about the composition and nominal dry coverage of these samples and the corresponding SER values before and after C-41 color photographic processing are provided in Table 2 below:

TABLE 2

| Sample | Component A EDOT dry wt. % | Component B Witcobond 232 dry wt. % | Nominal coverage g/m$^2$ | SER log ohm/square 50% RH before processing | SER log ohms/square 50% RH after C-41 processing |
|---|---|---|---|---|---|
| 1 | 5 | 95 | 0.3 | 9.3 | 9.9 |
| 2 | 5 | 95 | 0.6 | 9.9 | 9.7 |
| 3 | 5 | 95 | 1.0 | 9.8 | 10 |
| 4 | 10 | 90 | 0.3 | 9.8 | 10.2 |
| 5 | 10 | 90 | 0.6 | 9.4 | 9.7 |
| 6 | 10 | 90 | 1.0 | 9.1 | 9.4 |
| 7 | 20 | 80 | 0.3 | 8.4 | 9.8 |
| 8 | 20 | 80 | 0.6 | 7.8 | 9.3 |
| 9 | 20 | 80 | 1.0 | 7.2 | 8.9 |

It is clear that all these samples prepared, in accordance with the present invention, using EDOT as component A and Witcobond 232™ as component B have excellent conductivity before and after C-41 processing and, are effective as "process-surviving" antistatic layers that can be used as outermost layers without any protective topcoat to serve as a barrier layer.

The SER value of sample 4 is measured at low relative humidity, as n in Table 3 below. Clearly, the sample has excellent SER value even at 5% relative humidity consistent with electronic conductivity of the antistatic layer of the present invention.

TABLE 3

| Sample | SER log ohm/square 20% RH | SER log ohm/square 5% RH |
|---|---|---|
| 4 | 6.9 | 7 |

The following samples 10–12 are very similar to samples 4–6, respectively, except samples 10–12 do not comprise any crosslinking agent. Details about the composition and nominal dry coverage of these samples and the corresponding SER values before and after C-41 color photographic processing are provided in the following Table 4:

TABLE 4

| Sample | Component A EDOT dry wt. % | Component B Witcobond 232 dry wt. % | Nominal coverage g/m$^2$ | SER log ohm/square 50% RH before processing | SER log ohms/square 50% RH after C-41 processing |
|---|---|---|---|---|---|
| 10 | 10 | 90 | 0.3 | 9.3 | 9.2 |
| 11 | 10 | 90 | 0.6 | 8.1 | 8.8 |

TABLE 4-continued

| Sample | Component A EDOT dry wt. % | Component B Witcobond 232 dry wt. % | Nominal coverage g/m$^2$ | SER log ohm/square 50% RH before processing | SER log ohms/square 50% RH after C-41 processing |
|---|---|---|---|---|---|
| 12 | 10 | 90 | 1.0 | 8 | 8.7 |

It is clear that all these samples prepared as per the present invention without any crosslinking agent have excellent conductivity before and after C-41 processing and, thus, are also effective as "process-surviving" antistatic layers without the presence of any crosslinking agent.

Samples 13–15, prepared in accordance with the present invention, contain PPy as component A and Witcobond 232™ as component B. All these samples contain a small amount of Pluronic F88™ and cross-linking agent Neocryl CX100™, in relative amounts similar to those of samples 1–9. Details about the composition and nominal dry coverage of these samples and the corresponding SER values before and after C-41 color photographic processing are provided in the following Table 5:

TABLE 5

| Sample | Component A PPy dry wt. % | Component B Witcobond 232 dry wt. % | Nominal coverage g/m$^2$ | SER log ohm/square 50% RH before processing | SER log ohms/square 50% RH after C-41 processing |
|---|---|---|---|---|---|
| 13 | 25 | 75 | 0.3 | 9.4 | 9.0 |
| 14 | 25 | 75 | 0.6 | 9.4 | 9.3 |
| 15 | 25 | 75 | 1.0 | 9.4 | 10.1 |

It is clear that all these samples prepared in accordance with the present invention, using PPy as component A and Witcobond 232™ as component B, have excellent conductivity before and after C-41 processing and, thus, are effective as "process-surviving" antistatic layers which can be used as outermost layers without any protective topcoat.

Samples 16–18 are prepared as per the present invention with PPy as component A and Sancure 898™ as component B. All these samples contain a small amount of Pluronic F88™ and cross-linking agent Neocryl CX-100™, in relative amounts similar to those of samples 1–9. Details about the composition and nominal dry coverage of these samples and the corresponding SER values before and after C-41 color photographic processing are provided in the following Table 6:

TABLE 6

| Sample | Component A PPy dry wt. % | Component B Sancure 898 dry wt. % | Nominal coverage g/m$^2$ | SER log ohm/square 50% RH before processing | SER log ohms/square 50% RH after C-41 processing |
|---|---|---|---|---|---|
| 16 | 20 | 80 | 0.3 | 8.6 | 9.0 |
| 17 | 20 | 80 | 0.6 | 8.4 | 9.1 |
| 18 | 20 | 80 | 1.0 | 8.2 | 8.6 |

It is clear that all these samples prepared in accordance with the present invention, with PPy as component A and Sancure 898™ as component B, have excellent conductivity before and after C-41 processing and, thus, are effective as "process-surviving" antistatic layers which can be used as outermost layers without any protective topcoat.

In order to assess the abrasion resistance of the samples prepared as per the present invention, Taber abrasion tests are performed on samples 3, 6, 12 and 15 and the results are compared with that of a coating of Witcobond 232™ with the same nominal dry coverage of 1 g/m$^2$ (containing 5% by dry weight of Neocryl CX-100™ crosslinking agent). The latter coating is chosen for comparison, since it is a preferred topcoat with the necessary physical characteristics for scratch and abrasion resistance for motion picture print films, as per U.S. Pat. No. 5,679,505. The Taber haze values for samples 3, 6, 12 and 15, prepared as per the present invention, are found to be very close (within 15% deviation) to that of the coating per U.S. Pat. No. 5,679,505. This demonstrates that the present invention as a single, outermost antistatic layer, with or without a crosslinking agent, provides the same protection to scratch and abrasion as the protective topcoat of U.S. Pat. No. 5,679,505.

Comparative Examples

Comparative samples, Comp. 1 and 2, are prepared with component A being PPy and component B being a 1:1 (by weight) polyurethane blend of Witcobond 232™ and Bayhydrol PR 240™, supplied by Bayer Corporation. Bayhydrol PR 240™ is a much softer polyurethane than Witcobond 232™ and the requirement for the mechanical properties, as specified in the present invention, are not met in comparative samples Comp. 1 and 2. Both comparative samples Comp. 1 and 2, contained a small amount of Pluronic F88™ and cross-linking agent Neocryl CX-100™, in relative amounts similar to those of samples 1–9. Details about the composition and nominal dry coverage of these samples and the corresponding SER values before and after C-41 color photographic processing are provided in the following Table 7:

TABLE 7

| Sample | Component A PPy dry wt. % | Component B 1:1 blend of Witcobond 232 dry wt. % | Nominal coverage g/m$^2$ | SER log ohm/square 50% RH before processing | SER log ohms/square 50% RH after C-41 processing |
|---|---|---|---|---|---|
| Comp. 1 | 30 | 70 | 1.0 | 8.3 | 8.6 |
| Comp. 2 | 20 | 80 | 1.0 | 9.1 | 9.5 |

It is clear that comparative samples Comp. 1 and 2 have very good SER values before and after C-41 color photographic processing. However, the Taber haze values for comparative samples Comp. 1 and 2 were ~60% which is unacceptable as an abrasion resistant layer. This clearly demonstrates the inferiority of comparative samples Comp. 1 and 2 to samples prepared as per the present invention.

Aqueous colloidal dispersion of vanadium pentoxide, as described in U.S. Pat. Nos. 4,203,769; 5,006,451; 5,221,598 and 5,284,714 is mixed with an aqueous dispersion of Witcobond 232™, in 1:1 weight ratio. This resulted in coagulation of the mixture, rendering it unsuitable for coating. This indicates that the preferred antistatic component and the abrasion resistant polyurethane of U.S. Pat. No. 5,679,505, can not be combined and coated in a simple manufacturing process as an outermost, single antistatic, scratch and abrasion resistant layer, such as the one taught by the present invention.

Addition of triethyl amine to increase the pH of the aqueous colloidal dispersion of vanadium pentoxide results in coagulation. Addition of acetic acid to decrease the pH of the aqueous dispersion of Witcobond 232™ results in coagulation. This indicates that neither of these two ingredients can be pH adjusted in order to be combined in an aqueous coating composition. This further illustrates that the preferred antistatic component and the abrasion resistant polyurethane of U.S. Pat. No. 5,679,505, can not be combined and coated, even by the pH adjustment method of the present invention.

Aqueous dispersion of PPy is mixed with an aqueous dispersion of Witcobond 232™ in 20:80 ratio, without any pH adjustment. This results in coagulation of the mixture, rendering it unsuitable for coating.

Similar results are obtained when aqueous dispersion of EDOT is mixed with an aqueous dispersion of Witcobond 232™ in 10:90 ratio, without any pH adjustment. Stable dispersions are obtained only when the pH of EDOT dispersion is adjusted to 3 or above. This indicates that pH adjustment is a critical step in preparing the coating solutions for some preferred polyurethane binders, in accordance with the present invention.

The invention has been described in detail with particular reference to certain preferred embodiments thereof, but it will be understood that variations and modifications can be effected within the spirit and scope of the invention.

What is claimed is:

1. A process for forming an abrasion-resistant antistatic layer for an imaging element, said process comprising:

adjusting the pH of an aqueous composition of an electronically-conductive polymer to a pH of about 3 to about 10; and combining said pH-adjusted aqueous composition of said electronically-conductive polymer with an aqueous composition at a pH greater than 7 of a polyurethane film-forming binder having a tensile elongation to break of at least 50% and a Young's modulus measured at 2% elongation of at least 50000 psi, thereby forming a coating composition for said antistatic layer.

2. The process of claim 1 wherein said adjusting said pH of said aqueous composition of said electronically-conductive polymer is to a pH of about 5 to about 9.

3. The process of claim 1 wherein said adjusting pH is carried out by adding to said aqueous composition of said electronically-conductive polymer a reagent selected from the group consisting of an ammonium hydroxide, an alkali metal hydroxide, and an alkylamine.

4. The process of claim 3 wherein said adjusting pH is carried out by adding to said aqueous composition of said electronically-conductive polymer a reagent selected from the group consisting of ammonium hydroxide, sodium hydroxide, potassium hydroxide, tetraethylammonium hydroxide, and triethylamine.

5. The process of claim 3 wherein said adjusting pH is carried out by adding triethylamine to said aqueous composition of said electronically-conductive polymer.

6. The process of claim 1 wherein said aqueous composition of said polyurethane film-forming binder has a pH of about 8.

7. The process of claim 1 wherein said electronically-conducting polymer is selected from the group consisting of substituted pyrrole-containing polymers, unsubstituted pyrrole-containing polymers, substituted thiophene-containing polymers, unsubstituted thiophene-containing polymers, substituted aniline-containing polymers and unsubstituted aniline-containing polymers.

8. The process of claim 7 wherein said electronically-conducting polymer is selected from the group consisting of substituted and unsubstituted polypyrrolestyrene sulfonates and 3,4-dialkoxysubstituted polythiophene sulfonates.

9. The process of claim 8 wherein said electronically-conducting polymer is selected from the group consisting of poly(3,4-ethylenedioxypyrrolestyrene sulfonate) and poly (3,4-ethylenedioxythiophene sulfonate).

10. The process of claim 1 further comprising:

applying said coating composition to said imaging element, thereby forming an abrasion-resistant antistatic layer on said imaging element.

11. The process of claim 10 wherein said antistatic layer further comprises a crosslinking agents.

12. The process of claim 11 wherein said crosslinking agent comprises polyaziridine.

13. The process of claim 11 wherein said crosslinking agent comprises about 0.5 to about 30 weight % based on said polyurethane binder.

14. The process of claim 10 wherein said antistatic layer further comprises a lubricating agent.

15. The process of claim 10 wherein said electronically-conducting polymer comprises about 0.1–99 weight % of said antistatic layer.

16. The process of claim 10 wherein said polyurethane binder comprises about 99.9–1.0 weight % of said antistatic layer.

17. The process of claim 10 wherein said anti static layer further comprises sulfonated polystyrenes, copolymers of sulfonated styrene-maleic anhydride or polyester ionomers.

18. The process of claim 10 wherein said antistatic layer further comprises surfactants, coating aids, thickeners, coalescing aids, particle dyes, antifoggants, matte beads or lubricants.

19. The process of claim 10 wherein said antistatic layer comprises a dry weight coverage of between 5 $mg/m^2$ and 10,000 $mg/m^2$.

20. The process of claim 1 wherein said imaging element is selected from the group consisting of a photographic element, an electrostatographic element, a photothermographic element, a migration element, an electrothermographic element, a dielectric recording element, and a thermal dye transfer element.

21. The process of claim 20 wherein said imaging element is a photographic element comprising:

a support;

a silver halide image-forming layer superposed on said support; and said abrasion-resistant antistatic layer superposed on said support.

22. The process of claim 21 wherein said antistatic layer is superposed on a side of said support opposite said silver halide image-forming layer.

23. The process of claim 21 wherein said support is selected from the group consisting of cellulose nitrate film, cellulose acetate film, poly(vinyl acetal) film, polystyrene film, poly(ethylene terephthalate) film, poly(ethylene naphthalate) film, polycarbonate film, polyethylene films, polypropylene films, glass, metal and paper.

24. A photographic element comprising:

a support;

a silver halide image-forming layer formed on said support; and an abrasion-resistant antistatic layer formed on said support, said antistatic layer being formed from a coating composition obtained by adjusting the pH of an aqueous composition of an electronically-conductive polymer to a pH of about 3 to about 10, and combining said pH-adjusted aqueous composition of said electronically-conductive polymer with an aqueous composition at a pH greater than 7 of a polyurethane film-forming binder having a tensile elongation to break of at least 50% and a Young's modulus measured at 2% elongation of at least 50000 psi.

25. The photographic element of claim 24 wherein said electronically-conducting polymer is selected from the group consisting of substituted and unsubstituted polypyrrolestyrene sulfonates and 3,4-dialkoxysubstituted polythiophene sulfonates.

26. The photographic element of claim 24 wherein said aqueous composition of said electronically-conductive polymer is adjusted to a pH of about 5 to about 9.

27. An imaging element comprising:

a support;

an image-forming layer formed on said support; and an abrasion-resistant antistatic layer formed on said support, said antistatic layer being formed from a coating composition obtained by adjusting the pH of an aqueous composition of an electronically-conductive polymer to a pH of about 3 to about 10, and combining said pH-adjusted aqueous composition of said electronically-conductive polymer with an aqueous composition at a pH greater than 7 of a polyurethane film-forming binder having a tensile elongation to break of at least 50% and a Young's modulus measured at 2% elongation of at least 50000 psi.

28. The imaging element of claim 27 wherein said electronically-conducting polymer is selected from the group consisting of substituted and unsubstituted polypyrrolestyrene sulfonates and 3,4-dialkoxysubstituted polythiophene sulfonates.

29. The imaging element of claim 27 wherein said aqueous composition of said electronically-conductive polymer is adjusted to a pH of about 5 to about 9.

* * * * *